(12) United States Patent
Yano et al.

(10) Patent No.: US 10,544,827 B2
(45) Date of Patent: Jan. 28, 2020

(54) SEALED THRUST BEARING

(71) Applicants: JTEKT CORPORATION, Osaka-shi (JP); NAKANISHI METAL WORKS CO., LTD., Osaka-shi (JP)

(72) Inventors: Hiroshi Yano, Osaka (JP); Minoru Nakamura, Osaka (JP); Nozomi Yasufuku, Osaka (JP); Mitsuru Saito, Osaka (JP)

(73) Assignees: JTEKT CORPORATION, Osaka-shi (JP); NAKANISHI METAL WORKS CO., LTD., Osaka-shi (JP)

( * ) Notice: Subject to any disclaimer, the term of this patent is extended or adjusted under 35 U.S.C. 154(b) by 0 days.

(21) Appl. No.: 15/800,415

(22) Filed: Nov. 1, 2017

(65) Prior Publication Data
US 2018/0274587 A1    Sep. 27, 2018

(30) Foreign Application Priority Data
Mar. 22, 2017    (JP) .................................. 2017-055518

(51) Int. Cl.
*F16C 19/10* (2006.01)
*F16C 33/76* (2006.01)
*F16C 33/78* (2006.01)

(52) U.S. Cl.
CPC ............ *F16C 19/10* (2013.01); *F16C 33/761* (2013.01); *F16C 33/7823* (2013.01); *F16C 2240/54* (2013.01)

(58) Field of Classification Search
CPC ........ F16C 19/10; F16C 33/78; F16C 33/761; F16C 2240/54; F16C 33/7823
See application file for complete search history.

(56) References Cited

U.S. PATENT DOCUMENTS

| 2010/0239201 A1* | 9/2010 | Nakajima | ........... F16C 33/7879 384/446 |
| 2011/0069917 A1* | 3/2011 | Yamada | ................. B65G 39/09 384/470 |

(Continued)

FOREIGN PATENT DOCUMENTS

| JP | 2005-273854 A | 10/2005 |
| JP | 2006-112581 A | 4/2006 |

(Continued)

OTHER PUBLICATIONS

Machine Translation of JP 2008-248950 (Year: 2008).*

(Continued)

*Primary Examiner* — Alan B Waits
(74) *Attorney, Agent, or Firm* — Kratz, Quintos & Hanson, LLP

(57) ABSTRACT

A sealed thrust bearing includes an inner ring; an outer ring facing the inner ring in an axial direction; an elastic member that covers the inner ring so as to define; an inner elastic seal member that seals a space between an inner circumferential portion of the inner ring and an inner circumferential portion of the outer ring; and an outer elastic seal member that seals a space between an outer circumferential portion of the inner ring and an outer circumferential portion of the outer ring; and a lower member that is disposed below the outer ring for being assembled with the outer ring, and is provided with cation coating. The inner elastic seal member has a lip in pressure contact with an inner surface of one of a cylinder portion and a cylindrical portion of the lower member, and the outer elastic seal member has a lip in pressure contact with an upper surface of one of an annular ring portion and an annular portion of the lower member. The lip of the inner elastic seal member has an area including a portion in pressure contact with the lower member and is provided with an irregular portion having surface roughness (ten- (Continued)

point height of irregularities conforming to JIS B 0601-1994) from 20 µmRz to 50 µmRz.

1 Claim, 5 Drawing Sheets

(56) References Cited

U.S. PATENT DOCUMENTS

2014/0203520 A1* 7/2014 Yamanaka ............ F04D 29/106
 277/549
2015/0354706 A1* 12/2015 Yamanaka ........... F16J 15/3284
 277/570

FOREIGN PATENT DOCUMENTS

| JP | 2007-101352 A | 4/2007 | |
| JP | 2008-163995 A | 7/2008 | |
| JP | 2008151256 A * | 7/2008 | ............ F16C 33/588 |
| JP | 2008-248950 A | 10/2008 | |
| JP | 4748050 B2 | 8/2011 | |
| JP | 2015-048923 A | 3/2015 | |
| JP | 5757455 B2 | 7/2015 | |

OTHER PUBLICATIONS

Machine Translation of JP 2005-273854 (Year: 2005).*
Machine Translation of JP 2008-151256 (Year: 2008).*
Koyo, Deep Groove Ball Bearings/ProductlKoyo Bearings (JTEXT), Oct. 2, 2018, http://koyo.jtext.co.jp/en/products/type/deep-groove-ball-bearimg; pp. 1-6.
Partial English translation of "Manual of Rubber Industry, the 4th Edition," published by the Society of Rubber Science and Technology Japan, on Jan. 20, 1994, pp. 1268.

* cited by examiner

SEALED THRUST BEARING

BACKGROUND OF THE INVENTION

(1) Field of the Invention

The present invention relates to a sealed thrust bearing included in a vehicle strut suspension device or the like.

(2) Description of Related Art

In a strut suspension device often utilized as an independent suspension of a vehicle, a sealed thrust bearing provided between an upper mount and a lower mount can include an inner ring and an outer ring facing axially, a plurality of balls rollably disposed between opposite surfaces of the inner ring and the outer ring, an inner elastic seal member and an outer elastic seal member sealing inner circumferential portions and outer circumferential portions of the inner ring and the outer ring, respectively (see JP 4748050 B1 and the like).

The inner elastic seal member and the outer elastic seal member prevent separation between the inner ring and the outer ring, as well as prevent entry of foreign matter such as muddy water to the bearing as well as leakage of grease filled in the bearing.

JP 4748050 B1 discloses a configuration in which the inner elastic seal member is in pressure contact with the outer ring, the outer elastic seal member has a main lip in pressure contact with the outer ring, and the outer elastic seal member has a dust lip in pressure contact with a spring seat.

In contrast, there has been proposed a configuration including an outer elastic seal member having the same pressure contact target as in JP 4748050 B1 and an inner elastic seal member having a lip in pressure contact with a spring seat (JP 2016-145699 filed by the applicant of the present application; hereinafter referred to as the "prior application").

The spring seat is provided with uniform cation coating exerting excellent adhesiveness and an excellent antirust property, to achieve a quite high anticorrosion property.

Such cation coating provided on the spring seat has a quite smooth surface, so that the spring seat has a highly airtight pressure contact surface with the lip of the elastic seal member.

The prior application discloses a configuration in which the lip of the inner elastic seal member and the dust lip of the outer elastic seal member are in pressure contact with the spring seat.

If the bearing is raised in temperature by frictional heat or heat conduction from outside and is then cooled, the bearing has negative internal pressure to the outside. Such a pressure difference between the inside and the outside with the negative internal pressure of the bearing may cause a so-called adsorption phenomenon (see paragraph [0006] of JP 2008-163995 A) including firm adhesion of the lip of the inner elastic seal member to the lip pressure contact surface of the spring seat and significant increase in bearing torque.

There have been proposed, to avoid the adsorption phenomenon of the bearing, a projection provided on an inner surface of a seal lip (see JP 2008-163995 A and the like) and a plurality of ribs equally distributed on an inner surface of a seal lip (see JP 2015-048923 A and the like).

In order to decrease friction and inhibit lip abrasion in a sealing device such as a bearing, there has been proposed a configuration in which a seal lip has a slidable surface to which an irregular portion is provided and low base oil viscosity grease is supplied, the irregular portion has 1.5 to 3.0 µmRa (10 to 20 µmRz), and the low base oil viscosity grease has base oil kinetic viscosity from 10 to 40 mm$^2$/s at 40° C. (see JP 5757455 B1 and the like).

In the sealed thrust bearing structured as in the prior application, the cation coating provided on the spring seat has the quite smooth surface as described earlier, so that the grease is unlikely to be retained on the pressure contact surface at a radially inner surface of the spring seat in pressure contact with the lip of the inner elastic seal member.

Such poor lubrication may cause a so-called stick-slip phenomenon including self-induced vibration due to repeated sliding and sticking when the lip of the inner elastic seal member is slid along the pressure contact surface of the spring seat. This may cause unusual noise and damage to the lip.

SUMMARY OF THE INVENTION

In view of the above situation, it is an object of the present invention to provide a sealed thrust bearing causing no defect due to occurrence of an adsorption phenomenon and a stick-slip phenomenon.

In order to achieve the object, an aspect of the present invention provides a sealed thrust bearing including an inner ring; an outer ring facing the inner ring in an axial direction; an elastic member that covers the inner ring so as to define: an inner elastic seal member that seals a space between an inner circumferential portion of the inner ring and an inner circumferential portion of the outer ring; and an outer elastic seal member that seals a space between an outer circumferential portion of the inner ring and an outer circumferential portion of the outer ring; and a lower member that is disposed below the outer ring for being assembled with the outer ring, and is provided with cation coating, in which the inner elastic seal member has a lip in pressure contact with an inner surface of one of a cylinder portion and a cylindrical portion of the lower member, the outer elastic seal member has a lip in pressure contact with an upper surface of one of an annular ring portion and an annular portion of the lower member, and the lip of the inner elastic seal member has an area including a portion in pressure contact with the lower member and is provided with an irregular portion having surface roughness (ten-point height of irregularities conforming to JIS B 0601-1994) from 20 µmRz to 50 µmRz.

In the sealed thrust bearing according to an aspect of the present invention, the lip of the inner elastic seal member in pressure contact with the lower member provided with the cation coating has the area provided with the irregular portion of surface roughness (ten-point height of irregularities conforming to JIS B 0601-1994) from 20 µmRz to 50 µmRz. Thus, even upon occurrence of the adsorption phenomenon including adhesion of the lip to the pressure contact surface of the lower member due to internal pressure variation by temperature variation, air can gradually be released through gaps at the irregular portion as time elapses, thereby avoiding the adsorption phenomenon.

Furthermore, the irregular portion retains grease so as to inhibit the stick-slip phenomenon including unusual noise and damage to the lip due to poor lubrication.

A sealing property will not decrease because the irregular portion has surface roughness within the above range.

DETAILED DESCRIPTION OF PREFERRED EMBODIMENTS

A preferred embodiment of the present invention will now be described in detail with reference to the accompanying drawings. The present invention is not limited to the mode of the accompanying drawings but includes all embodiments satisfying requirements recited in the claims.

A sealed thrust bearing according to the following embodiment has a basic structure similar to that of the first embodiment of the prior application.

<Structure of Sealed Thrust Bearing>

Figure 1:
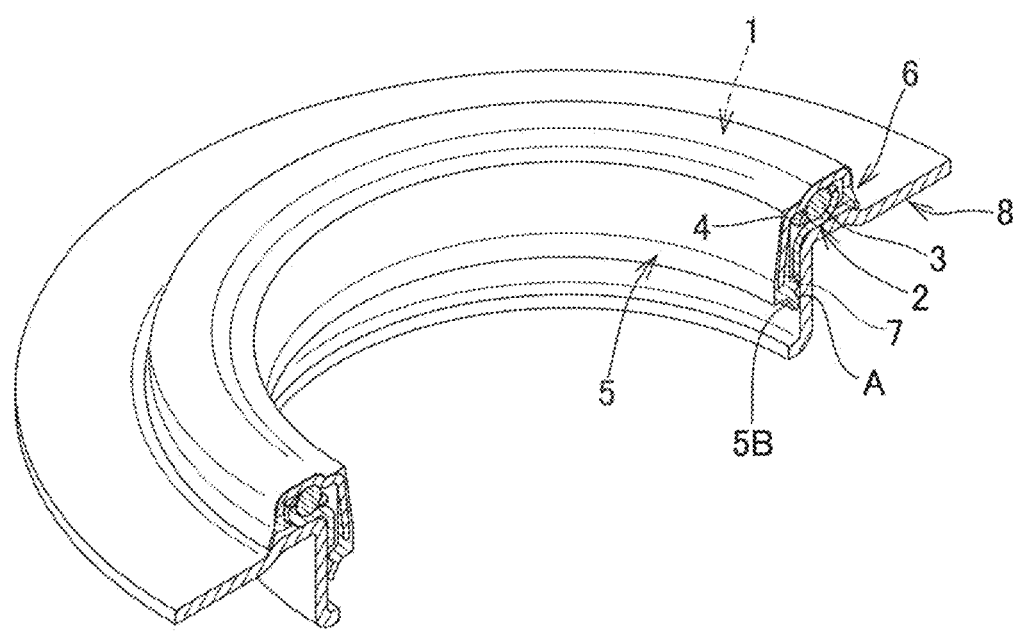
FIG. 1 is a longitudinal sectional perspective view of a sealed thrust bearing according to an embodiment of the present invention.
Figure 2:
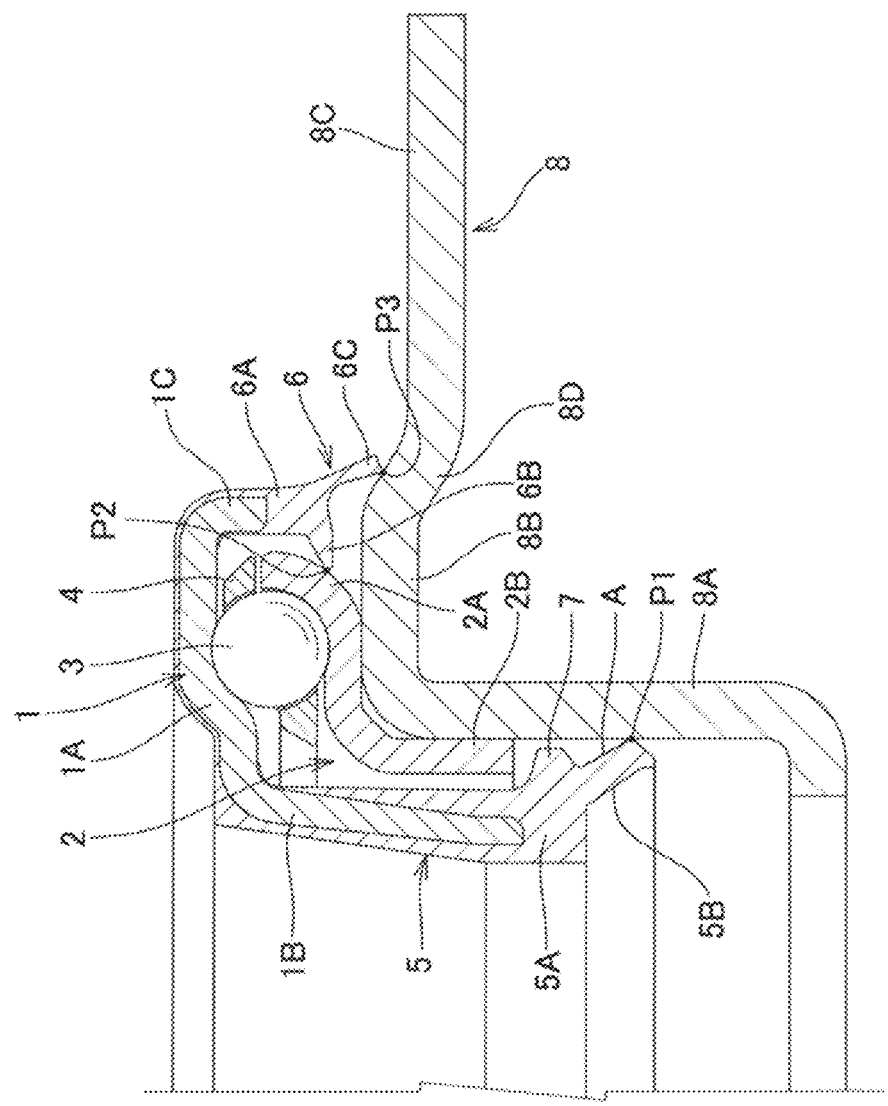
FIG. 2 is an enlarged longitudinal sectional side view of a main part thereof.

As depicted in a longitudinal sectional perspective view of FIG. 1 and a longitudinal sectional side view of FIG. 2, the sealed thrust bearing according to the embodiment of the present invention includes an inner ring 1 and an outer ring 2 having an annular shape and facing axially, a plurality of balls 3, 3, . . . rollably disposed between opposite surfaces of the inner ring 1 and the outer ring 2 and retained by a retainer 4, an inner elastic seal member 5 and an outer elastic seal member 6 provided as elastic bodies integrally covering the inner ring 1 and sealing inner circumferential portions and outer circumferential portions of the inner ring 1 and the outer ring 2. There is enclosed grease serving as lubricant between the inner ring 1 and the outer ring 2.

The sealed thrust bearing according to the present embodiment is structured to be applicable to vehicle strut suspension, and the outer ring 2 is integrally assembled to a spring seat 8 as a lower member disposed at a lower end of the outer ring 2 to receive a spring.

The spring seat 8 includes a radially inner cylinder portion 8A, a flange portion 8B extending radially outward from an upper end of the cylinder portion 8A, a flange portion 8C stepped down from the flange portion 8B and extending outward, and a slant portion 8D connecting the flange portions 8B and 8C.

The inner ring 1, the outer ring 2 and the spring seat 8 are produced by pressing a steel plate, and the spring seat 8 is provided with cation coating.

In order to provide the cation coating on the spring seat 8, cation electrodeposition paint is electrodeposited to a surface of the spring seat 8 that is immersed in a vessel containing the paint. The surface of the spring seat 8 is then provided with a highly smooth and excellently antirust coating film.

The balls 3, 3, . . . are made of steel and the retainer 4 is made of synthetic resin.

Each of the inner elastic seal member 5 and the outer elastic seal member 6 is provided by covering the inner ring 1 as a core with an elastic body such as synthetic rubber through vulcanized adhesion to be integrated with the inner ring 1, and has a lip structure at a distal end thereof.

Examples of a rubber material for the elastic body include a rubber raw material having excellent oil resistance, containing any one selected from nitrile rubber (NBR), hydrogenated nitrile rubber (HNBR), acrylic rubber (ACM), ethylene-acrylic rubber (AEM), fluororubber (FKM or FPM), silicone rubber (VQM), and the like, or containing two or more selected and blended appropriately.

In consideration of kneading processability, vulcanized moldability, and adhesiveness with the core inner ring 1, of the rubber material, the rubber material is also preferred to be blended with rubber of a different type, such as liquid NBR, ethylene-propylene rubber (EPDM), natural rubber (NR), isoprene rubber (IR), styrene-butadiene rubber (SBR), butadiene rubber (BR), or the like.

In the longitudinal sectional side view of FIG. 2, the inner ring 1 and the outer ring 2 have a curved portion 1A and a curved portion 2A, respectively, serving as track portions of the balls 3, 3, . . . , the inner elastic seal member 5 is disposed below an inner cylindrical portion 1B extending downward at a radially inner portion of the inner ring 1 and gradually slightly reduced in diameter toward a lower end, and the outer elastic seal member 6 is disposed below an outer cylindrical portion 1C extending downward at a radially outer portion of the inner ring 1.

The outer ring 2 is provided with, at a radially inner portion thereof, an inner cylinder portion 2B extending downward. The inner cylinder portion 2B is press fitted to an inner diameter portion of the cylinder portion 8A of the spring seat 8. There is a horizontal portion connecting from a lower portion of the curved portion 2A of the outer ring 2 to an upper end of the inner cylinder portion 2B and having a lower surface in contact with an upper surface of the flange portion 8B of the spring seat 8.

<Structure and Function of Inner Elastic Seal Member>

As depicted in the longitudinal sectional side view of FIG. 2, the inner elastic seal member 5 includes an inner cylindrical base 5A connected to an end of the inner cylindrical portion 1B of the inner ring 1, and a lip 5B disposed below the inner cylindrical base 5A and being in pressure contact with a pressure contact surface P1 at a radially inner surface of the spring seat 8.

The lip 5B of the inner elastic seal member 5 is in pressure contact with an inner surface of the cylinder portion 8A of the spring seat 8, and prevents entry of foreign matter such as muddy water from outside. Dependent on the shape of the spring seat 8, the lip 5B can alternatively be in pressure contact with an inner surface of a cylindrical portion such as an inner surface of a slant portion connected to the cylinder portion of the spring seat 8.

The inner cylindrical base 5A has an outer circumferential surface provided with a protrusion 7 extending radially outward from a lower end inner circumference of the inner cylinder portion 2B of the outer ring 2. As depicted in a longitudinal sectional side view of FIG. 3, upon completion of assembly of the inner ring 1, the outer ring 2, and the spring seat 8, the protrusion 7 has an upper surface 7A distant downward from a lower end of the inner cylinder portion 2B of the outer ring 2, and an outer peripheral surface 7C distant radially inward from the spring seat 8.

<Structure and Function of Outer Elastic Seal Member>

As depicted in the longitudinal sectional side view of FIG. 2, the outer elastic seal member 6 includes a main lip 6B extending radially inward to be in pressure contact with a pressure contact surface P2 at an outer peripheral surface of the curved portion 2A of the outer ring 2, a dust lip 6C extending downward to be in pressure contact with a pressure contact surface P3 at an upper surface of the slant portion 8D of the spring seat 8, and an outer cylindrical base 6A disposed above the main lip 6B and connected to an end of the outer cylindrical portion 1C of the inner ring 1.

The dust lip 6C of the outer elastic seal member 6 is in pressure contact with an upper surface of an annular portion (the slant portion 8D) of the spring seat 8, and prevents entry of foreign matter such as muddy water from outside. Dependent on the shape of the spring seat 8, the dust lip 6C can alternatively be in pressure contact with an annular ring portion (the flange portion) of the spring seat 8.

The main lip 6B of the outer elastic seal member 6 prevents leakage of grease filled in the bearing, and prevents separation between the inner ring 1 and the outer ring 2.

In the configuration described above, when the inner ring 1 and the outer ring 2 shift to be axially separated from each other, the protrusion 7 provided at the inner cylindrical base 5A of the inner elastic seal member 5 of the inner ring 1 and extending radially outward comes into contact with the lower end of the inner cylinder portion 2B of the outer ring 2, thereby significantly increasing a separation load.

In addition, the upper surface of the protrusion 7 is distant downward from the lower end of the inner cylinder portion 2B of the outer ring 2 and the outer peripheral surface of the protrusion 7 is distant radially inward from the spring seat 8 upon completion of assembly of the inner ring 1, the outer ring 2, and the spring seat 8. The protrusion 7 thus does not come into contact with any other component while the bearing is rotating and, therefore, the baring is not increased in rotary torque.

Furthermore, the outer peripheral surface of the protrusion 7 extending radially outward is distant radially inward from the spring seat 8, and the protrusion 7 thus serves also as a labyrinth seal with adjustment of a gap therebetween.

Moreover, the inner elastic seal member 5 includes the lip 5B whereas the outer elastic seal member 6 includes the dust lip 6C to seal so as to prevent the outer ring 2 from contacting with outside air. The outer ring 2 thus does not need to be processed to have an antirust property, which leads to reduction in production cost.

<Irregular Portion Provided at Lip of Inner Elastic Seal Member>

Figure 3:
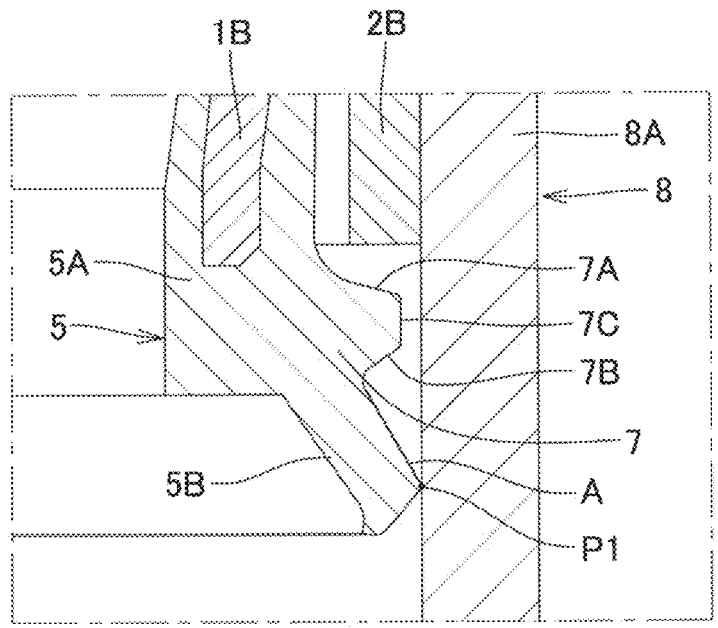
FIG. 3 is an enlarged longitudinal sectional side view of an inner elastic seal member and the vicinity thereof.
Figure 4:
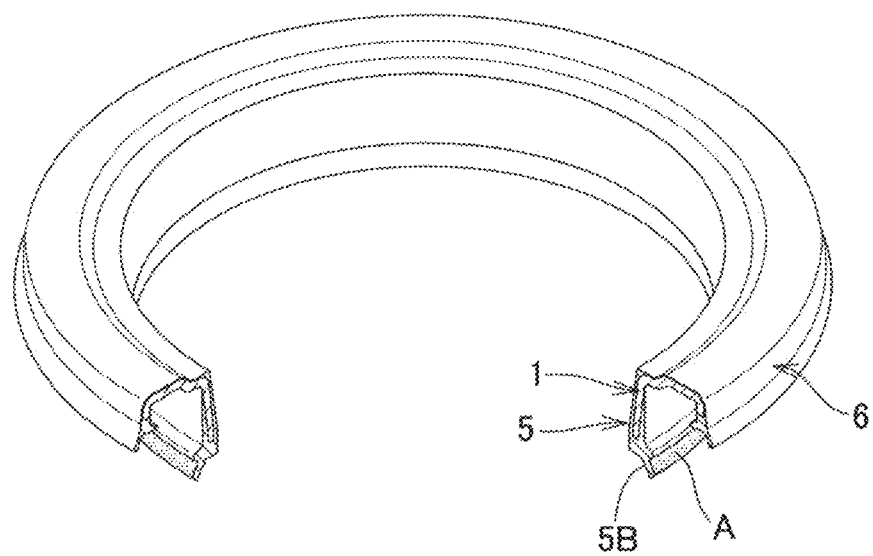
FIG. 4 is a longitudinal sectional perspective view of an inner ring, the inner elastic seal member, and an outer elastic seal member, which are extracted.
Figure 5:
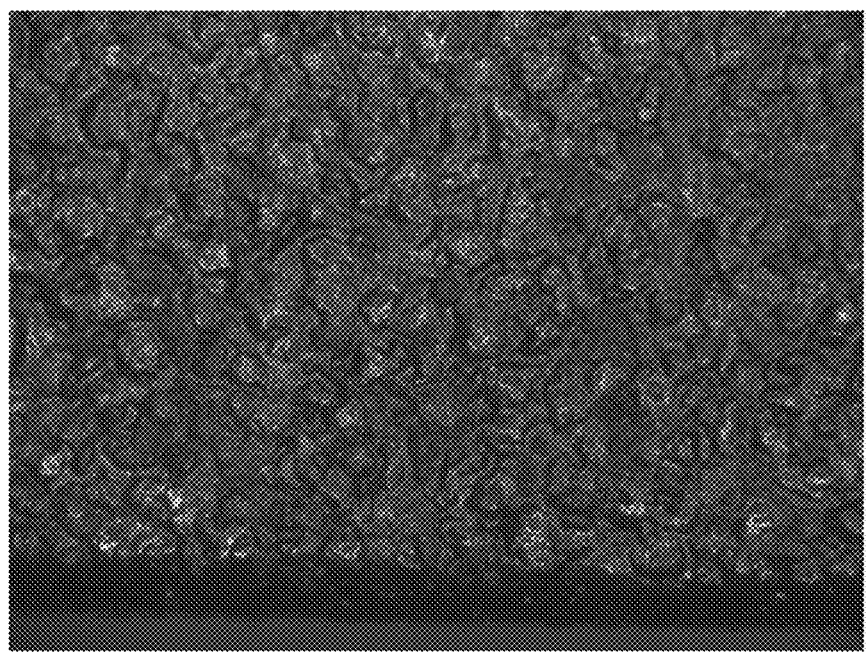
FIG. 5 is a macrophotograph of an irregular portion provided in an area including a portion of a lip of the inner elastic seal member in pressure contact with a spring seat.

In addition to FIGS. 1 to 3. FIG. 4 is a longitudinal sectional perspective view depicting the inner ring 1, the inner elastic seal member 5, and the outer elastic seal member 6, which are extracted. The lip 5B of the inner elastic seal member 5 in pressure contact with the pressure contact surface P1 at the radially inner surface of the spring seat 8 has an area A including the portion in pressure contact with the spring seat 8 and provided with an irregular portion. FIG. 5 is a macrophotograph of the irregular portion.

The irregular portion is provided through satin treatment or the like to have surface roughness (ten-point height of irregularities conforming to JIS B 0601-1994) from 20 μmRz to 50 μmRz.

The fine irregular portion in the area A of the lip 5B is formed easily by transferring irregularities provided on a vulcanized mold tool through blast machining like shot blasting, electrical discharge machining, or the like, thereby preventing increase in production cost.

<Check Test on Effect of Irregular Portion Provided at Lip of Inner Elastic Seal Member>

There were prepared inner elastic seal members 5 each including the lip 5B provided with the irregular portion having different surface roughness (see examples and comparative example to be described below), and the inner elastic seal members 5 were subjected to a stick-slip test and a sealing property test.

EXAMPLES

Examples 1 to 6 correspond to the irregular portions having surface roughness (ten-point height of irregularities conforming to JIS B 0601-1994: Rz) of 22 μm, 25 μm, 30 μm, 35 μm, 41 μm, and 49 μm, respectively.

Comparative Examples

Comparative examples 1 to 3 correspond to the irregular portions having surface roughness (ten-point height of irregularities conforming to JIS B 0601-1994: Rz) of 5 μm, 17 μm, and 57 μm, respectively.

<Stick-Slip Test>

(Test Method)

The sealed thrust bearing depicted in FIGS. 1 and 2 is assembled to a vehicle strut suspension device, the inner ring 1 is swung with respect to the outer ring 2, and acceleration is measured with an acceleration sensor.

Figure 6A:
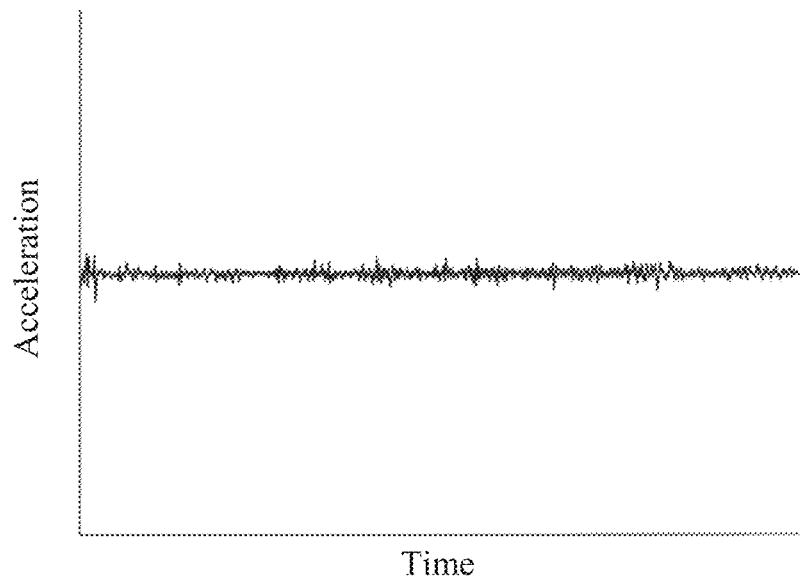
FIG. 6A indicates an exemplary time-base waveform of vibrational acceleration in a stick-slip test, when exemplarily determined as including no stick-slip behavior.
Figure 6B:
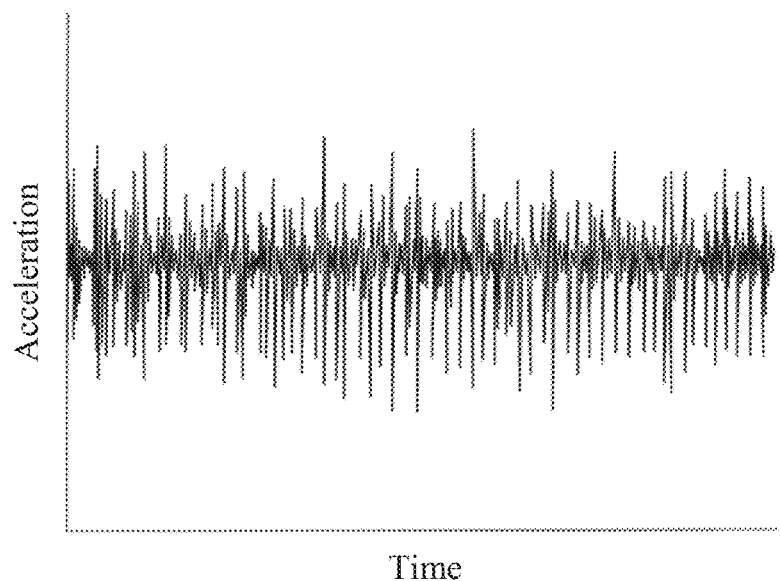
FIG. 6B indicates an exemplary time-base waveform of vibrational acceleration in the stick-slip test, when exemplarily determined as including stick-slip behavior.

The bearing was heated at 90° C. for 30 minutes, was then left at normal temperature for 30 minutes, and was tested to be determined as "◯: stick-slip behavior not observed" if vibration acceleration has a time-base waveform indicated in FIG. 6A, or to be determined as "x: stick-slip behavior observed" if the vibration acceleration has a time-base waveform indicated in FIG. 6B.

(Test Results)

Table 1 indicates the test results. The comparative example 1 (5 μmRz) and the comparative example 2 (17 μmRz) were determined as "x: stick-slip behavior observed", whereas the comparative example 3 (57 μmRz) was determined as "◯: stick-slip behavior not observed".

In contrast, the examples 1 to 6 (22 μmRz to 49 μmRz) were all determined as "◯: stick-slip behavior not observed".

<Sealing Property Test>

(Test Method)

The sealed thrust bearing depicted in FIGS. 1 and 2 is assembled to a vehicle strut suspension device, the inner ring 1 is swung with respect to the outer ring 2, and muddy water is sprayed radially outward from an inside of the inner elastic seal member 5 to check entry of muddy water to the inner elastic seal member 5.

The inner elastic seal member 5 having no entry of muddy water was determined as "◯: entry of muddy water not observed", and the inner elastic seal member 5 having entry of muddy water was determined as "x: entry of muddy water observed".

(Test Results)

Table 1 indicates the test results. The comparative example 3 (57 μmRz) was determined as "x: entry of muddy water observed", whereas the comparative example 1 (5 μmRz) and the comparative example 2 (17 μmRz) were determined as "◯: entry of muddy water not observed".

In contrast, the examples 1 to 6 (22 μmRz to 49 μmRz) were all determined as "◯: entry of muddy water not observed".

TABLE 1

| | Examples/Comparative examples | | | | | | | | |
|---|---|---|---|---|---|---|---|---|---|
| | Example 1 | Example 2 | Example 3 | Example 4 | Example 5 | Example 6 | Comparative Example 1 | Comparative Example 2 | Comparative Example 3 |
| Surface roughness Rz (μm) of irregular portion provided at lip of inner elastic seal member | 22 | 25 | 30 | 35 | 41 | 49 | 5 | 17 | 57 |
| Stick-slip test (Note 1) | ○ | ○ | ○ | ○ | ○ | ○ | X | X | ○ |
| Sealing property test (Note 2) | ○ | ○ | ○ | ○ | ○ | ○ | ○ | ○ | X |

(Note 1) ○: Stick-slip behavior not observed, X: Stick-slip behavior observed
(Note 2) ○: Entry of muddy water not observed, X: Entry of muddy water observed If surface roughness of the irregular portion is less than 20 μmRz as in the comparative examples 1 and 2, oil film retention capacity is likely to decrease to cause poor lubrication, which is likely to cause the stick-slip phenomenon. When surface roughness is less than 20 μmRz and is particularly small, the adsorption phenomenon is likely to occur. In order to avoid such defects, the irregular portion according to the present invention has surface roughness not less than 20 μmRz.

When the irregular portion has surface roughness more than 50 μmRz as in the comparative example 3, the sealing property is likely to decrease to cause entry of foreign matter such as muddy water to the bearing and leakage of grease filled in the bearing. In order to avoid such defects, the irregular portion according to the present invention has surface roughness not more than 50 μmRz.

The present invention provides the inner elastic seal member 5 including the lip 5B having the area A provided with the irregular portion of the surface roughness described above. Even when the adsorption phenomenon occurs to cause the lip 5B to adhere to the pressure contact surface P1 of the spring seat 8 provided with cation coating due to internal pressure variation by temperature variation, air can gradually be released through gaps at the irregular portion as time elapses, thereby avoiding the adsorption phenomenon.

Furthermore, the irregular portion retains grease so as to inhibit the stick-slip phenomenon including unusual noise and damage to the lip 5B due to poor lubrication, as indicated in the test results.

The above embodiment describes the sealed thrust bearing configured as a sealed thrust ball bearing. The sealed thrust bearing can alternatively be configured as a slide bearing.

What is claimed is:

1. A sealed thrust bearing to be used between an upper mount and a lower mount in a vehicle strut suspension device, the sealed thrust bearing comprising:
   an inner ring;
   an outer ring facing the inner ring in an axial direction;
   an elastic member that covers the inner ring so as to define: an inner elastic seal member that seals a space between an inner circumferential portion of the inner ring and an inner circumferential portion of the outer ring; and an outer elastic seal member that seals a space between an outer circumferential portion of the inner ring and an outer circumferential portion of the outer ring; and
   a spring seat that receives a spring, is disposed below the outer ring for being assembled with the outer ring, and is provided with cation coating,
   wherein the inner elastic seal member has a lip in pressure contact with an inner surface of one of a cylinder portion of the spring seat and a slant portion connected to the cylinder portion and has a protrusion extending radially outward, between the lip of the inner elastic seal member and a lower end of an inner cylinder portion of the outer ring, the protrusion extending radially outward from an inner periphery of the lower end of the inner cylinder portion, to be spaced apart from the cylinder portion of the spring seat,
   the outer elastic seal member has a lip in pressure contact with an upper surface of one of an annular ring portion of the spring seat and an annular portion of the spring seat,
   the lip of the inner elastic seal member has an area including a portion in pressure contact with the spring seat and is provided with an irregular portion having surface roughness (ten-point height of irregularities conforming to JIS B 0601-1994) from 20 μmRz to 50 μmRz, and
   even upon occurrence of adsorption phenomenon including adhesion of the lip to a pressure contact surface of the spring seat to which the cation coating is provided, due to internal pressure variation by temperature variation, air can be released through gaps at the irregular portion as time elapses, thereby avoiding the adsorption phenomenon.

\* \* \* \* \*